(No Model.)
E. R. SPENCER.
LACING BEARING.
No. 364,057. Patented May 31, 1887.
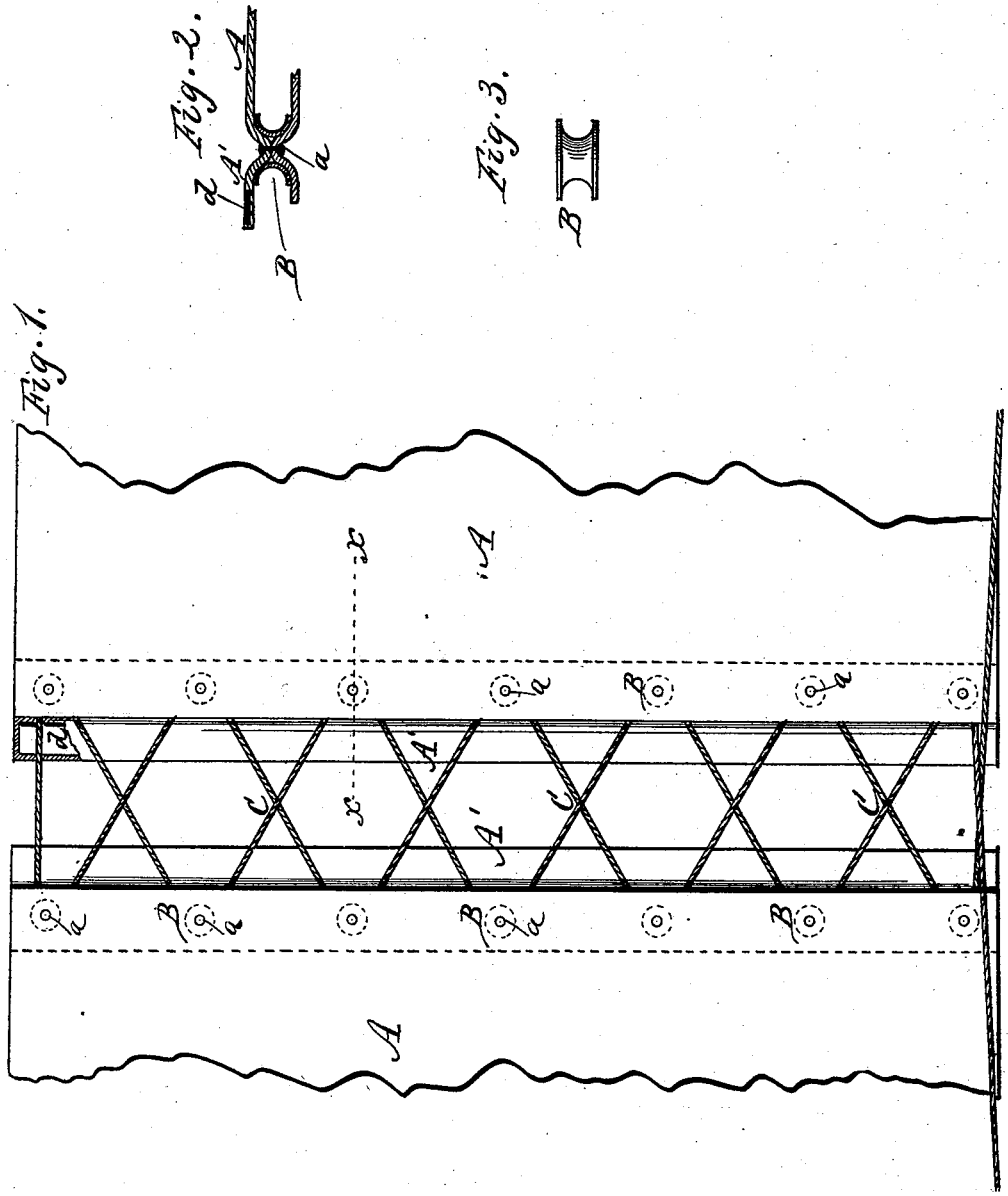
Attest.
A. S. Smith
F. B. Hutchinson
Inventor.
Esther R. Spencer,
pr R. F. Osgood.
Atty

United States Patent Office.

ESTHER R. SPENCER, OF ROCHESTER, NEW YORK, ASSIGNOR TO THE SELF-ADJUSTING CORSET COMPANY, OF SAME PLACE.

LACING-BEARING.

SPECIFICATION forming part of Letters Patent No. 364,057, dated May 31, 1887.

Application filed September 25, 1886. Serial No. 214,503. (No model.)

*To all whom it may concern:*

Be it known that I, ESTHER R. SPENCER, of the city of Rochester, in the county of Monroe and State of New York, have invented a certain new and useful Improvement in Lacing-Bearings; and I do hereby declare that the following is a full, clear, and exact description of the same, reference being had to the drawings accompanying this application.

My improvement relates to lacing-bearings for corsets, shoes, gloves, and other articles in which lacing-cords are used to draw flaps or sides together, and is of that kind where the bearings are applied between flies or flaps, and the lacing-cord passes between said flies or flaps and around the bearings. Various devices for the purpose are already known, consisting of pulleys, eyes, studs, &c., and such I do not claim, broadly.

My invention consists, essentially, of a bearing in the form of a hollow pulley inserted between the flies, and having the fabric indented or compressed down into the hollow of the bearing at the center, covering and inclosing the same, and secured through the opening of the bearing by any suitable fastening, whereby the bearing is held firmly in place, and is shielded and prevented from coming in contact with the clothing.

It also consists in the combination, with the above, of an extension of the fly provided with a stiffener that is offset or stands in advance of the lacing-edge, all as hereinafter described.

In the drawings, Figure 1 is a back elevation of the lacing-edges of a corset showing my improvement. Fig. 2 is an enlarged cross-section of one edge of same in line *x x* of Fig. 1. Fig. 3 is a plan view of one of the lacing-bearings.

A A indicate the two edges which are to be laced.

B B are the lacing-bearings, and C is the lacing-cord. Each of the lacing-edges A is made double or of two thicknesses at the edge, and the bearings B B are inserted between them and secured in place, and the lacing-cord passes freely between the edges and around the bearings. My improvement is as follows:

The bearings B B are made in the form of pulleys, but hollow, leaving a clear opening through the center, as shown. They are placed between the flaps, and the fabric is then indented or forced down in cup shape into the opening till the sides meet, and are secured together by means of any suitable fastening, *a*, that passes through the two thicknesses. The fastening shown in the drawings is a headed pin or tack, which can be applied by a suitable instrument; but other forms of fastenings may be used, and simple stitching will answer. By this construction the fabric that covers the bearing is not broken, except by the simple puncture of the fastening device, and the whole strength is thus preserved. Usually in this class of lacings the bearing or its shaft extends through holes made in the fabric, and the strain produced on the bearings in use is transferred to the fabric, and it soon wears or breaks away. In my invention, as the fabric remains intact, there is much less tendency to wear or break out. In ordinary lacings, also, washers are required to secure the parts, involving the use of several pieces, which are expensive, while in this invention but a single piece is required to make the bearing, excepting the small fastening that goes through the opening. This makes the device exceedingly cheap, as well as effective.

Another important advantage is that the bearings are covered and shielded entirely by the cloth, and no metal is exposed to rub or come in contact with the clothing, as is the case where washers or eyelets are used outside. The small fastening is sunken so deep in the hollow of the bearing that it does not come to the surface.

The lacing-edge A has an extension, A', offset or projecting outward beyond the edge in which the bearings are placed. In this extension is placed a steel or other stiffener or stay, *d*, which extends the whole length of the lacing. It therefore lies outside, where it will be covered and held down by the lacing-cord, which produces a close and smooth fit, and prevents any interference with the passage of the cord around the bearings.

Having described my invention, what I claim as new, and desire to secure by Letters Patent, is—

1. The combination, with the lacing-edge consisting of two flaps or flies, and with the lacing-cord, of hollow bearings inserted between the flaps or flies, and fastenings passing through the bearings, said flaps or flies entirely covering and inclosing the bearings at the sides, and the fastenings passing through and securing the two sides of the fabric within the hollow of the bearings, as set forth.

2. The combination, with the lacing-edge consisting of two flaps or flies, and with the lacing-cord, of pulley-shaped bearings inserted between the flaps or flies, with the fabric indented into the hollow of the bearings, and fastenings consisting of pins passing through the bearings and securing the fabric, as set forth.

3. The combination, with the lacing-edges provided with bearings secured by indenting and fastening the fabric in the hollow sides of the bearings, of extensions to the lacing-edges provided with stiffeners, as set forth.

In witness whereof I have hereunto signed my name in the presence of two subscribing witnesses.

ESTHER R. SPENCER.

Witnesses:
P. A. COSTICH,
R. F. OSGOOD.